(12) United States Patent
Yang

(10) Patent No.: US 7,949,710 B2
(45) Date of Patent: May 24, 2011

(54) SYSTEM AND METHOD FOR INSTANT MESSENGER TO MAKE FRIEND BY CYBER PET

(76) Inventor: Beong-Sok Yang, Gwangju-si (KR)

( * ) Notice: Subject to any disclaimer, the term of this patent is extended or adjusted under 35 U.S.C. 154(b) by 51 days.

(21) Appl. No.: 12/595,490

(22) PCT Filed: Apr. 8, 2008

(86) PCT No.: PCT/KR2008/001986
§ 371 (c)(1),
(2), (4) Date: Oct. 9, 2009

(87) PCT Pub. No.: WO2008/127007
PCT Pub. Date: Oct. 23, 2008

(65) Prior Publication Data
US 2010/0138504 A1   Jun. 3, 2010

(30) Foreign Application Priority Data
Apr. 12, 2007  (KR) .......................... 10-2007-0035803

(51) Int. Cl.
*G06F 15/16* (2006.01)
*G06F 3/00* (2006.01)

(52) U.S. Cl. .......................... 709/204; 709/206; 715/753
(58) Field of Classification Search .......... 709/204–206; 345/473; 715/751, 753, 758
See application file for complete search history.

(56) References Cited

U.S. PATENT DOCUMENTS
7,519,661 B2 *   4/2009   Slotznick .................... 709/204
\* cited by examiner

*Primary Examiner* — Yemane Mesfin
(74) *Attorney, Agent, or Firm* — Howard M. Gitten; Edwards Angell Palmer & Dodge LLP

(57) ABSTRACT

A method by which a service system including an instant messenger server provides users with a service for raising a cyber pet and making friends through the cyber pet, includes the service system's providing and installing an instant messenger program to a user; receiving, storing and managing the user's friend list; displaying a cyber pet on the user's client terminal when an instant messenger active window is opened; and in the case that the user does not raise the cyber pet for a predetermined time, receiving the user's friend list and friend lists of another users hierarchically linked thereto, forming a potential friend list from the collected friend lists of another users, moving the cyber pet to the friend list and the potential friend list of the user, and displaying the cyber pet to another user executing the instant messenger.

36 Claims, 3 Drawing Sheets

[Fig. 1]
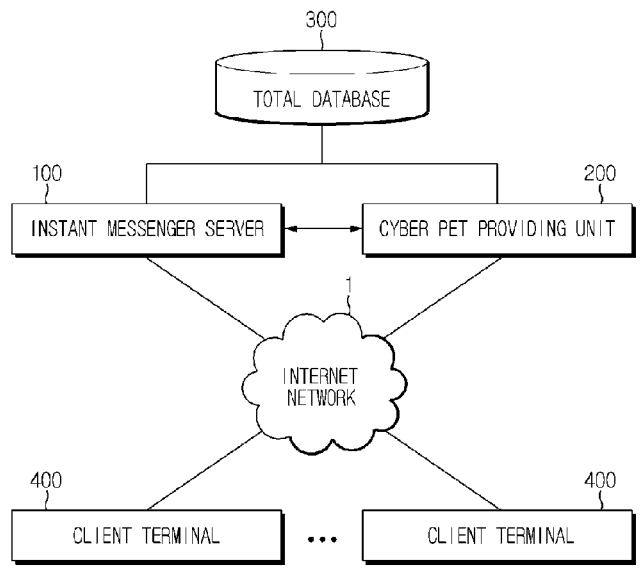
[Fig. 2]
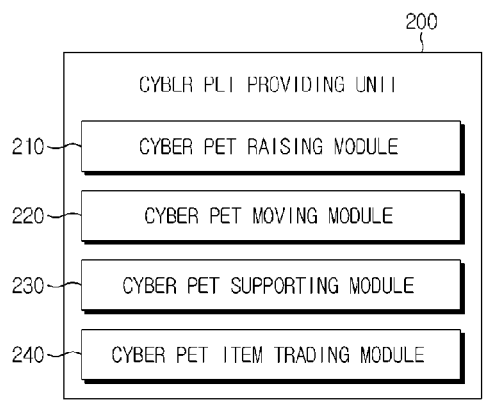
[Fig. 3]
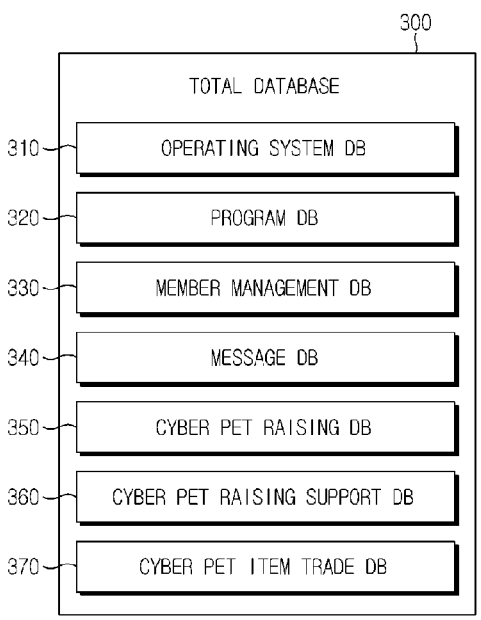

[Fig. 4]
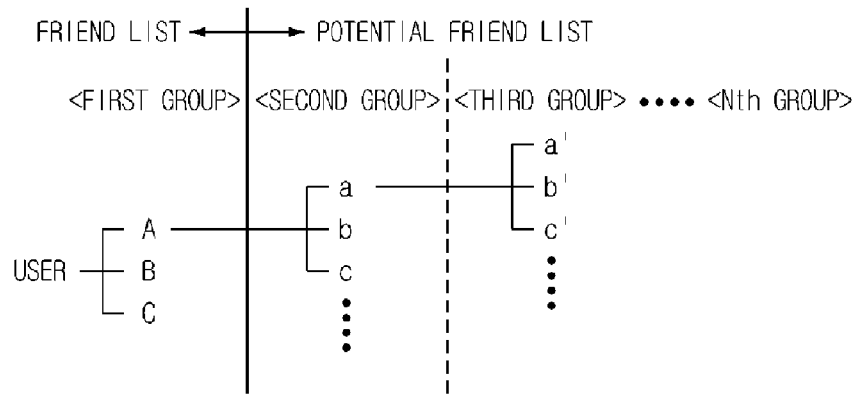
[Fig. 5]
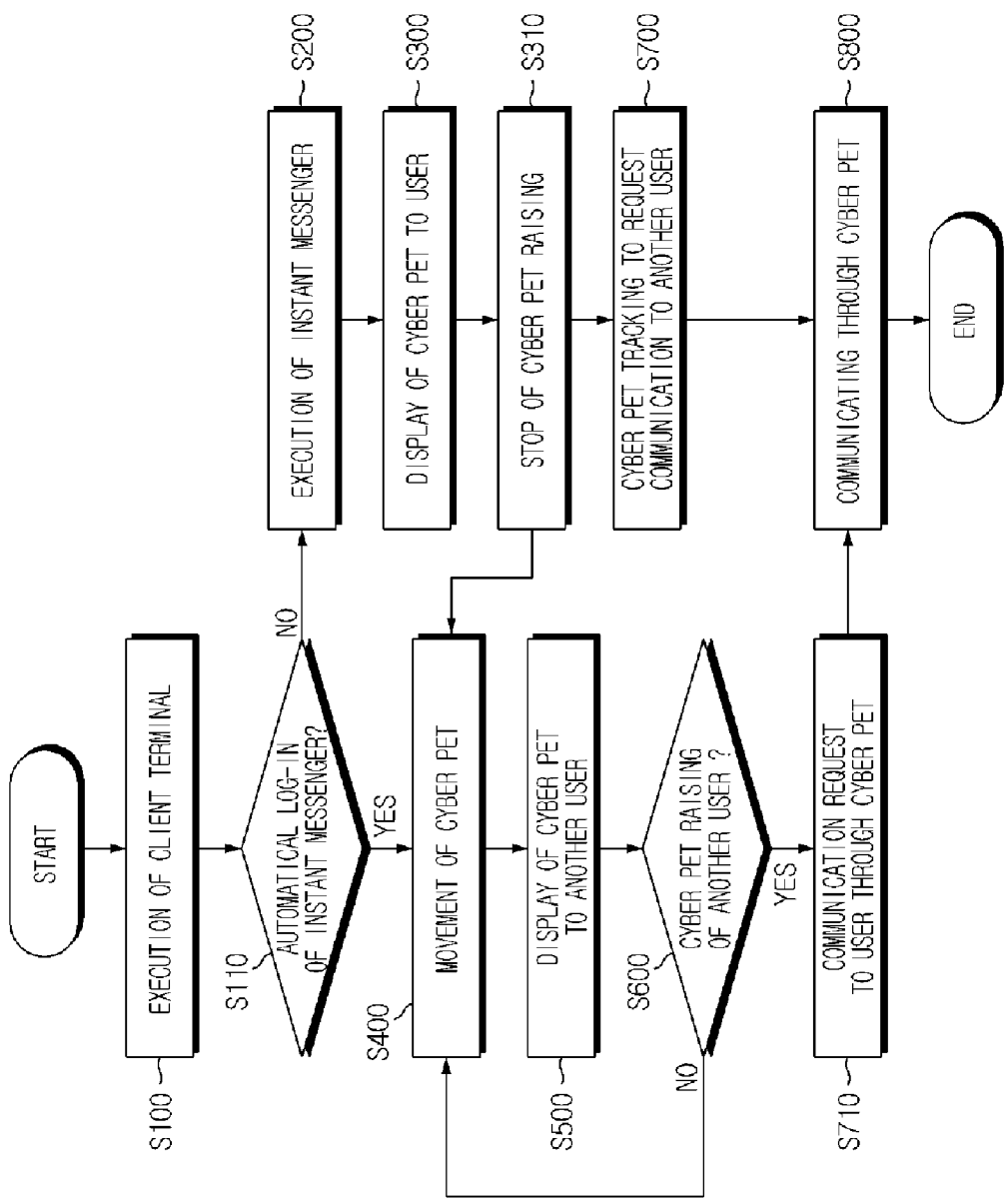

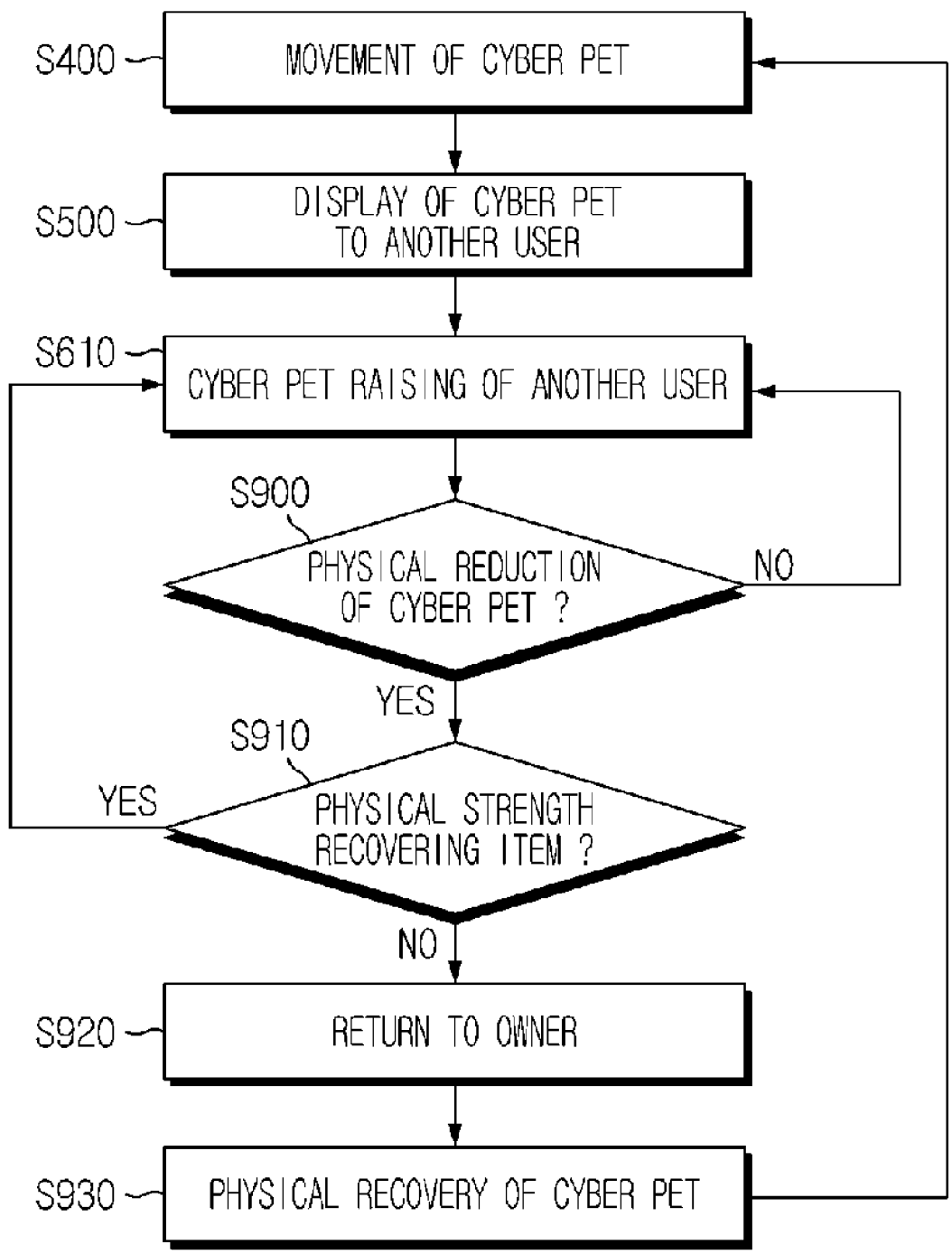

SYSTEM AND METHOD FOR INSTANT MESSENGER TO MAKE FRIEND BY CYBER PET

CROSS-REFERENCE TO RELATED APPLICATIONS

This application claims priority to Korean patent application no. 10-2007-0035803 filed Apr. 12, 2007; and PCT/KR2008/001986 file Apr. 8, 2008 in their entirety.

TECHNICAL FIELD

The present invention relates to an instant messenger system for making friends by a cyber pet and a method for providing the same, and in particular, to an instant messenger system for raising a cyber pet that moves to a registered friend list of an instant messenger user and a potential friend list derived from the registered friend list and making friends through the cyber pet, and a method for providing the same.

BACKGROUND ART

With an active exchange of information using Internet, the use of instant messenger services through various messenger programs including E-mail becomes common. An instant messenger is incorporated such that when a friend registered in a friend list of a user connected to a messenger server logs in, the user is informed of his/her friend's log-in, and like chatting or telephone, the user and his/her friend communicate with each other in real time using a real-time transmission service of memo, files or materials between them. And, the instant messenger can implement various communication functions terminal to terminal without an additional connection to a web site between users who installed the same instant messenger program. And, an instant messenger program has a small capacity itself, and thus can be easily installed in a terminal and does not require separate costs for download.

According to a general operating principle, the instant messenger recognizes IP (Internet Protocol) addresses of users registered in a friend list to check their online status and provides various services. An operating technology of the instant messenger includes central networking, P2P (Peer-to-Peer) connecting, or a combination thereof.

Meanwhile, as the number of instant messenger service providers increases in recent days, there is no distinct difference between their services. And, due to characteristics of instant messenger users, they are very faithful to a messenger service selected once, and thus the instant messenger service providers have difficulty in getting users using another service over to their sides.

Recently, as interests in a pet including a dog and population of pet owners increase offline, web sites providing various pet-raising contents are created on Internet. However, a conventional cyber pet raising method satisfies a desire that a user wants to enjoy raising a pet by himself/herself, but not a desire that the user wants to tell or show other users the shape, a raising method or a raising level of his/her pet through communication with them.

Therefore, various studies are made to solve the problems of the conventional instant messenger service and cyber pet raising method.

DISCLOSURE OF INVENTION

Technical Problem

The present invention is designed to solve the above-mentioned problems, and therefore it is an object of the present invention to provide an instant messenger system for making friends through a cyber pet moving to a registered friend list, which provides a user using an instant messenger with a service capable of moving a cyber pet to his/her registered friend list, so that the user can easily tell or show other users his/her cyber pet, and in which the cyber pet can move to the registered friend list of the user and besides to a friend list of a friend in his/her registered friend list, so that the user can make friends through the cyber pet, and a method thereof.

Technical Solution

In order to achieve the above-mentioned object, a method for instant messenger to make friends by a cyber pet according to the present invention, which provides a user using an instant messenger with a service for raising a cyber pet and making friends through the cyber pet, comprises (a) providing a user connected to an instant messenger server of a service provider with an instant messenger program having a service function for raising a cyber pet and making friends through the cyber pet, and executing the instant messenger in a client terminal of the user having the instant messenger program installed therein; (b) opening an active window of the instant messenger in the client terminal of the user and displaying the cyber pet on the active window; and (c) in the case that the user does not raise the cyber pet for a predetermined time, collecting a friend list of each friend registered in a friend list of the user, moving the cyber pet to a potential friend list including the collected friend list with a predetermined probability, and when an active window is opened in a client terminal of another user, displaying the cyber pet on the active window of the client terminal of the another user, wherein the cyber pet is raised by the user or the another user, and raising information of the cyber pet is exchanged and communication through the cyber pet is established between the user and the another user.

According to the present invention, the instant messenger is executed in the step (a) automatically when the user executes the client terminal or when the user requests direct execution of the instant messenger, and in the case that the instant messenger is automatically executed, the cyber pet moves to the potential friend list of the user with a predetermined probability.

Preferably, the potential friend list of the user in the step (c) includes a friend list of first group registered in the instant messenger of the user, a friend list of second group registered in an instant messenger of each friend of first group, and a friend list of N group formed in the same way.

According to the present invention, in the step (c), the cyber pet moves to a friend registered in the friend list of first group by designation of the user.

According to the present invention, in the step (c), the cyber pet moves to the potential friend list at random with probability set by the user.

According to the present invention, when the cyber pet moves to the potential friend list at random in the step (c), the cyber pet moves to the second group with higher probability than to the first group.

Preferably, in the case that the cyber pet has a special item or the cyber pet is a special character, the cyber pet is movable to a fourth group or a subsequent group in the potential friend list in the step (c).

Preferably, in the case that the cyber pet moves to another user and is not raised by the another user for a predetermined time, the cyber pet continuously moves to yet another user in the step (c).

Preferably, as the time that the cyber pet moves to or stays at another user increases, a status index (a physical index and a health index) of the cyber pet decreases, and in the case that the status index falls to a predetermined index or less, the cyber pet returns to the user. Here, the status index of the cyber pet is recovered by using a status index recovering item or as a predetermined time passes after the cyber pet returns to the user.

Preferably, in the step (c), movement route and state information of the cyber pet moved to the potential friend list of the user is displayed on the instant messenger of the user, and information of another user where the cyber pet moved is provided to the user, so that the user can read the information of the another user.

Preferably, in the step (c), movement tracking and state information of the cyber pet that moved to another user of the potential friend list of the user is displayed on an instant messenger of the another user, and an owner information of the cyber pet is provided to the another user, so that the another user can read the owner information of the cyber pet.

According to the present invention, the movement route is displayed including yet another users located between the another user where the cyber pet moved and the owner of the cyber pet.

According to the present invention, the cyber pet of the user and a cyber pet of the another user are moved together to yet another user in the step (c).

Preferably, the number of cyber pets visiting the instant messenger of the user is limited to a predetermined number.

In order to achieve the above-mentioned object, a system for instant messenger to make friends by a cyber pet according to the present invention, which provides a user using an instant messenger with a service for raising a cyber pet and making friends through the cyber pet, comprises an instant messenger server for providing an instant messenger program having a service function for raising a cyber pet and making friends through the cyber pet, and maintaining connection information of users connected to an instant messenger to allow communication between the users; a cyber pet providing unit for providing a service for raising a cyber pet that moves to a friend list of a user; a total database for cooperating with the instant messenger server and the cyber pet providing unit to store and update information of the user and the cyber pet; and a client terminal having the instant messenger program installed therein, and when the instant messenger is executed and an active window of the instant messenger is opened, for displaying the cyber pet to provide the user with a cyber pet raising service, wherein, in the case that the cyber pet is not raised in the client terminal of the user for a predetermined time, the system collects a friend list of each friend registered in a friend list of the user, moves the cyber pet to a potential friend list including the collected friend list with a predetermined probability, and when an active window of an instant messenger is opened in a client terminal of another user, displays the cyber pet to provide the another user with a cyber pet raising service, so that exchange of raising information of the cyber pet and communication through the cyber pet is established between the user and the another user.

According to the present invention, the cyber pet is at least one individual of the same or different kind selected from the group consisting of a living thing existing offline, an imaginary thing not existing offline and a lifeless machinery, and is embodied as an image capable of voice, text and motion expression.

According to another aspect, the present invention provides a computer readable medium stored thereon a program capable of executing a service for making friends through a cyber pet moving to a friend list.

BRIEF DESCRIPTION OF THE DRAWINGS

FIG. 1 is a configuration view illustrating an instant messenger service system for providing a service capable of raising a cyber pet that moves to a friend list registered in an instant messenger and making friends through the cyber pet according to a preferred embodiment of the present invention.

FIG. 2 is a configuration view illustrating schematically a configuration of a cyber pet providing unit according to a preferred embodiment of the present invention.

FIG. 3 is a configuration view illustrating a total database according to a preferred embodiment of the present invention.

FIG. 4 is a view illustrating a potential friend list according to a preferred embodiment of the present invention.

FIG. 5 is a flow chart illustrating movement of a cyber pet of an instant messenger and communication through the cyber pet according to a preferred embodiment of the present invention.

FIG. 6 is a flow chart illustrating repetitive movement and return of the cyber pet of the instant messenger according to a preferred embodiment of the present invention.

BEST MODE FOR CARRYING OUT THE INVENTION

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

FIG. 1 is a configuration view illustrating an instant messenger service system for providing a service capable of raising a cyber pet that moves to a friend list registered in an instant messenger according to a preferred embodiment of the present invention.

Referring to FIG. 1, the instant messenger system according to a preferred embodiment of the present invention comprises an instant messenger server 100, a cyber pet providing unit 200, a total database 300, and a client terminal 400 of a user using an instant messenger.

The instant messenger server 100, the cyber pet providing unit 200 and the total database 300 are connected with each other to form a system. The system and the client terminal 400 are connected with each other through an Internet network 1. Here, the Internet network 1 includes a wired Internet network based on TCP/IP or a wireless Internet network based on WAP (Wireless Application Protocol), HSPDA (High Speed Downlink Packet Access) or Wibro (Wireless Broadband).

The instant messenger server 100 has an instant messenger program with a service function capable of raising a cyber pet that moves to a registered friend list and making friends through the cyber pet, and provides a client terminal 400 of a user with the instant messenger program. The instant messenger server 100 maintains connection information of client terminals 400 connected to the instant messenger to support communication between the client terminals 400.

The cyber pet providing unit 200 provides the client terminal 400 with a cyber pet raising service.

The total database 300 cooperates with the instant messenger server 100 and the cyber pet providing unit 200 to store and update information of users and cyber pets. The total database 300 stores information of instant messenger users and information necessary to raise cyber pets.

The client terminal 400 includes a computer, PDA or a mobile phone that has a web browser to allow Internet connection and download and execution of an instant messenger program.

The above-mentioned instant messenger system according to present invention is implemented such that a user executes an instant messenger installed in the client terminal 400 and is provided with a cyber pet raising service, in the case that the user does not raise the cyber pet for a predetermined period, the cyber pet moves to a potential friend list including a friend list of first group of the user, a friend list of second group of each friend of the first group, and a friend list of N group formed in the same way, and is raised by the user or another user, and exchange of raising information of the cyber pet and communication through the cyber pet is established between the user and the another user.

FIG. 2 is a configuration view illustrating schematically a configuration of the cyber pet providing unit 200 according to a preferred embodiment of the present invention.

Referring to FIG. 2, the cyber pet providing unit 200 includes a cyber pet raising module 210, a cyber pet moving module 220, a cyber pet supporting module 230 and a cyber pet item trading module 240.

The cyber pet raising module 210 provides a module for displaying and raising a cyber pet according to execution of the instant messenger program so that a user can generate, raise and breed his/her own cyber pet. And, the cyber pet raising module 210 is a user interface for controlling behavior pattern and necessities of the cyber pet. For example, the cyber pet raising module 210 allows the user to control the behavior pattern of the cyber pet through a mouse button and to open an inventory window having items corresponding to necessities of the cyber pet and apply the items to the cyber pet.

The cyber pet moving module 220 is provided from the instant messenger server 100 with a friend list of first group of the user, a friend list of second group of each friend of the first group and a friend list of N group formed in the same way, and combines the friend lists into a potential friend list. When the user does not raise the cyber pet for a predetermined period, the cyber pet moving module 220 moves the cyber pet to the potential friend list with a predetermined probability.

For example, the cyber pet may be moved to a friend registered in the friend list of first group by designation of the user, to the potential friend list at random with a probability set by the user, or to a friend list of first group with a probability of 10%, a friend list of second group with a probability of 70% and a friend list of third group with a probability of 20% at random. In movement probability for each group suggested as a third method among the above-mentioned methods, because a friend of the first group is an acquaintance of the user, the first group does not need to be given with a high movement probability, and because the user can get more closely acquainted with the second group through the cyber pet, the second group is given with a high movement probability. And, conditions may be set so that the cyber pet can move to a fourth group and subsequent groups only in the case that the cyber pet has a special item or the cyber pet is special.

When the cyber pet is moved from an owner to another user and raised by the another user, and in the case that the cyber pet is not raised by the another user for a predetermined period, the cyber pet moving module 220 moves the cyber pet to yet another user continuously. However, the movement of the cyber pet may be limited. That is, as the moving time of the cyber pet or the time of the cyber pet's stay at another user increases, the cyber pet moving module 220 decreases a status index (physical index and health index) of the cyber pet. Then, in the case that the status index falls to a predetermined level or less, the cyber pet moving module 220 returns the cyber pet to the original user. To prevent the cyber pet from returning to the original user, the user may give the cyber pet an item for recovering the status index of the cyber pet. Meanwhile, as a predetermined time passes after the cyber pet returned to the original user due to decrease of the status index, the cyber pet moving module 220 may increase the status index of the cyber pet, or the cyber pet moving module 220 may recognize that the user used an item for recovering the status index of the cyber pet and increase the status index of the cyber pet. When the status index of the cyber pet increases, in the case that movement conditions of the cyber pet are satisfied, the cyber pet moving module 220 moves the cyber pet to the another user again.

The cyber pet supporting module 230 supports the user's designation of the kind of a cyber pet and the population of a cyber pet intended to raise, and the user's selection and use of various items for raising a cyber pet. And, the cyber pet supporting module 230 supports output of text, graphic and sound for changing the shape and behavior pattern of a cyber pet selected by the user and the use of various items for raising a cyber pet. Here, the behavior pattern of the cyber pet means behavior of the cyber, for example, tumbling, running and sleeping. In the present invention, the number of cyber pets that can be raised is not limited to one. Therefore, the present invention may use at least one cyber pet of the same kind or two or more different kinds. Each cyber pet is embodied as a dynamic image capable of voice, text and motion expression. The cyber pet may include Mammlia, fishes, Amphibia, Retilia, birds, insect species and plants existing offline, or imaginary animals not existing offline, and may include lifeless machinery. However, the cyber pet of the present invention is not limited to a specific kind. And, the cyber pet is realized by a motion capture type operation. Further, the raising item may include an item for changing the behavior pattern of the cyber, a feeding item for necessities of the cyber pet, an item for clothes or accessories of the cyber pet, an item for a house of the cyber pet and an item for recovering the status index decreased due to movement to the potential friend list, however the present invention is not limited in this regard. Preferably, the above-mentioned cyber pet raising item is sold by a service provider with charge, and may be traded using cyber money.

The cyber pet item trading module 240 provides a process for an electronic commercial trade of a cyber pet and a raising item between a service provider and a user or between users. The electronic commercial trade includes gift, lending, exchange, purchase and trade.

FIG. 3 is a configuration view illustrating the total database 300 according to a preferred embodiment of the present invention.

Referring to FIG. 3, the total database 300 stores data for disposing processes of the instant messenger server 100 and the cyber pet providing unit 200 so that a service provider can provide an instant messenger service having a service function for raising a cyber pet and making friends through the cyber pet.

The total database 300 includes an operating system DB 310 for operation of the instant messenger server 100, a program DB 320 for storing an instant messenger program and an application program, a member management DB 330 for managing information of users, a message DB 340 for storing message sending/receiving information between users, a cyber pet raising DB 350 for storing raising information of a cyber pet, a cyber pet raising support DB 360 for storing information of a cyber pet and an item, and a cyber pet item trade DB 370 for storing item trade information of a user.

The above-mentioned instant messenger system is divided according to functions, not according to concept of physics and hardware, and may be implemented by an application software programmed to perform each function.

FIG. 4 is a view illustrating the potential friend list according to a preferred embodiment of the present invention.

As shown in FIG. 4, a friend list informs a user using an instant messenger whether friends of first group registered directly by the user are online or offline, and the user can select any one of friends registered in the friend list and freely communicate with the selected friend.

The potential friend list includes a friend list of second group of each friend registered in the friend list of first group of the user, a friend list of third group of each friend registered in the friend list of second group, and a friend list of N group formed in the same way. In principle, the user can communicate with only friends registered in the friend list of first group. However, according to the instant messenger of the present invention, the user can communicate with users of a group subordinate to the first group as well as friends registered in the friend list of first group through the cyber pet.

When the cyber pet moving module 220 detects that the user does not raise the cyber pet, the cyber pet moving module 220 moves the cyber pet to the potential friend list, and another user who is contacted with the moved cyber pet can raise the cyber per. Here, movement of the cyber pet means that the cyber pet is displayed on a computer monitor of another user. And, when the another user clicks the cyber pet, the another user can have information about an owner of the cyber pet and exchange raising information with the owner of the cyber pet or communicate with a user as an owner through the cyber pet. If reliability between the user and the another user is formed through the above-mentioned procedure, a subordinate group may belong to the friend list of first group by agreement between them.

FIG. 5 is a flow chart illustrating movement of the cyber pet and communication through the cyber pet according to a preferred embodiment of the present invention.

As shown in FIG. 5, a user using an instant messenger operates his/her client terminal (S100). At this time, the client terminal has an instant messenger program with a service function for raising a cyber pet and making friends through the cyber pet that is installed by connecting to a homepage of an instant messenger service provider.

Subsequently, the user using the instant messenger may set so that the instant messenger is executed automatically or directly by himself/herself when operating the client terminal (S110 and S200).

First, in the case that the instant messenger is automatically executed when the client terminal is operated, if the user executed the instant messenger, but the instant messenger was not activated, the cyber pet moves at random to another user registered in the potential friend list by the cyber pet moving module 220 (S400). Here, activation means that the user executes a specific program on a screen of the client terminal and opens a display window of the specific program on the screen, so that manipulation of the program can be executed.

Subsequently, when the another user activates the instant messenger, the cyber pet is displayed to the another user (S500). At this time, preferably the cyber pet is displayed only when the another user activates his/her instant messenger, which is because if the cyber pet is displayed the another user when the another user is on another business, the another user may have a sense of rejection on the cyber pet. And, preferably the number of cyber pets visiting the another user is limited to a predetermined number or less to prevent overload of the client terminal of the another user caused by visit of excessive number of cyber pets.

The another user gets interested in the cyber pet and raises the cyber pet, or does not raise the cyber pet (S600). At this time, in the case that the another user raises the cyber pet, the another user can watch the cyber pet, control behavior pattern or necessities of the cyber pet, know movement route and state information of the cyber pet and read an owner information of the cyber pet.

The movement route may include yet another users located between the owner of the cyber pet where the cyber pet started and the another user where the cyber pet moved. For example, referring to FIG. 4, in the case that the cyber pet is located at "a'" of a third group, the location of "a'" of the third group is displayed to the another user together with "A" of the first group and "a" of the second group.

However, in the case that the another user does not raise the cyber pet, the cyber pet returns to the step (S400) and moves to yet another user.

Meanwhile, when the user directly executes the instant messenger to activate the instant messenger, the cyber pet is displayed to the user (S300). The user watches the cyber pet, or controls behavior pattern and necessities of the cyber pet. Here, to control the behavior pattern and necessities of the cyber pet, the instant messenger has a button for ordering action of the cyber pet, and the user operates the button to control the behavior pattern and necessities of the cyber pet. Next, if the user stops raising the cyber pet and a predetermined time passes (S310), the process of the present invention proceeds with the step S400, so that the cyber pet is moved to another user registered in the potential friend list.

Meanwhile, the user having the cyber pet can know movement route and status information of the cyber pet that moved to the potential friend list, and read information of another user where the cyber pet moved. Tracking of the movement route may include yet another user located between another user where the cyber pet moved and an owner of the cyber pet. For example, referring to FIG. 4, in the case that the cyber pet is located at "a'" of the third group, a location of the user as an owner of the cyber pet is displayed to the another user (a') together with "a" of the second group and "A" of the first group.

Next, the another user may apply for communication to the user as an owner of the cyber pet through the cyber pet, or the user may apply for communication to the another user visited by the cyber pet through the cyber pet (S700 and S710).

Then, the user and the another user make a communication through the cyber pet or exchange information about the cyber pet according to application (S800). The information exchange about the cyber pet may be made by chatting.

Meanwhile, in the case that intimacy between the cyber pet of the user and a cyber pet of the another user is high, both of the cyber pets may be moved to yet another user. At this time, intimacy between the cyber pets is determined at random, and preferably intimacy between cyber pets of the opposite sex is set higher than intimacy between cyber pets of the same sex.

FIG. 6 is a flow chart illustrating repetitive movement and return of the cyber pet of the instant messenger according to a preferred embodiment of the present invention.

As shown in FIG. 6, the cyber pet of the instant messenger continuously moves to the potential friend list (S400), and accordingly the cyber pet is displayed to another user (S500).

Subsequently, the another user raises the cyber pet (S610). However, the time used while the cyber pet moves to the another user or stays at the another user increases, the physical index of the cyber pet decreases (S900).

In the case that the another user wants to raise the cyber pet with decreased physical index longer, the another user may give the cyber pet an item for recovering the physical strength of the cyber pet (S910). The cyber pet, of which physical strength was recovered by the item may be continuously raised by the another user.

However, in the case that the cyber pet is not provided with a physical strength recovering item and its physical index is decreased, the cyber pet returns to the owner (S920). As time passes after the cyber pet returns, the physical strength of the cyber pet is recovered (S930), and the cyber pet with the recovered physical strength returns to the step S400, so that the cyber pet may move to yet another user.

As such, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

The present invention provides a user using an instant messenger with an instant messenger service for making friends through a cyber pet that can move to a friend list of the user and a potential friend list derived from the friend list, so that the user's desire for telling or showing other users his/her cyber pet is satisfied, and the user can form a close friendship with his/her registered friends and gain acquaintance with friends of his/her registered friends through communication using the cyber pet. At this time, reliability between the user and new friends is deepened through the user's registered friends and conditions for active interchange between the user and his/her registered friends are established by movement of the cyber pet.

The invention claimed is:

1. A method for making friends by a cyber pet, by which a service system including an instant messenger server provides a user using an instant messenger with a service for raising a cyber pet and making friends through the cyber pet moving to a registered friend list, the method comprising:
    (a) providing a user connected to the instant messenger server with an instant messenger program having a service function for raising a cyber pet and making friends through the cyber pet via an Internet network, the instant messenger program being to be installed in the user's client terminal;
    (b) collecting information of a registered friend list of the user from the instant messenger program executed in the user's client terminal, and storing and managing the information in the instant messenger server;
    (c) when an active window of the instant messenger is opened at the user's client terminal, displaying the cyber pet on the user's client terminal; and
    (d) in the case that the user does not raise the cyber pet for a predetermined time, receiving from the instant messenger server a first group friend list registered by the user, and a second group friend list registered by each friend in the first group friend list and an Nth group friend list (N is 2 or more) hierarchically linked thereto and forming a potential friend list from the second and subsequent group friend lists, moving the cyber pet to the first group friend list and the potential friend list of the user with a predetermined probability, and displaying the cyber pet on a client terminal of another user executing the instant messenger,
    wherein the service system enables the user or the another user to raise the cyber pet, and raising information exchange of the cyber pet between the user and the another user and communication mediation through the cyber pet therebetween.

2. The method for making friends by a cyber pet according to claim 1, wherein the instant messenger is executed in the step (a) automatically upon operation of the user's client terminal or as per the user's direct request of execution of the instant messenger.

3. The method for making friends by a cyber pet according to claim 2, wherein, in the case that the instant messenger is automatically executed, the service system moves the cyber pet to the first group friend list and the potential friend list of the user with a predetermined probability.

4. The method for making friends by a cyber pet according to claim 1, wherein the potential friend list of the user in the step (d) includes a second group friend list registered in an instant messenger of each friend in the first group friend list of the user, and an Nth (N is 2 or more) group friend list hierarchically linked thereto.

5. The method for making friends by a cyber pet according to claim 1, wherein, in the step (d), the cyber pet moves to any friend registered in the first group friend list by designation of the user.

6. The method for making friends by a cyber pet according to claim 4, wherein, in the step (d), the cyber pet moves to the first group friend list and the potential friend list of the user at random with probability set by the user.

7. The method for making friends by a cyber pet according to claim 4, wherein, when the cyber pet moves to the first group friend list and the potential friend list of the user in the step (d), the cyber pet moves to the second group friend list with higher probability than to the first group friend list.

8. The method for making friends by a cyber pet according to claim 4, wherein, in the case that the cyber pet has a special item or the cyber pet is a special character, the cyber pet is movable to fourth and subsequent group friend lists of the potential friend list in the step (d).

9. The method for making friends by a cyber pet according to claim 4, wherein, in the case that the cyber pet moves to another user and is not raised by the another user for a predetermined time, the cyber pet continues to move to yet another user in the step (d).

10. The method for making friends by a cyber pet according to claim 9, wherein as time used for the cyber pet to move to or stay at another user increases, a status index (a physical index and a health index) of the cyber pet decreases, and in the case that the status index falls to a predetermined level or less, the cyber pet returns to the user.

11. The method for making friends by a cyber pet according to claim 10, wherein the status index of the cyber pet is recovered using a status index recovering item by the user or the another user or as a predetermined time passes after the cyber pet returns to the user.

12. The method for making friends by a cyber pet according to claim 4, wherein the cyber pet of the user and a cyber pet of another user are moved together to yet another user in the step (d).

13. The method for making friends by a cyber pet according to claim 4, wherein the number of cyber pets visiting the instant messenger of the user is limited to a predetermined number.

14. The method for making friends by a cyber pet according to claim 4, wherein, in the step (d), movement route and state information of the cyber pet moved to the potential friend list of the user is displayed on the instant messenger of the user, and information of another user where the cyber pet moved is provided to the user, so that the user is able to read the another user's information.

15. The method for making friends by a cyber pet according to claim 4, wherein, in the step (d), movement route and state information of the cyber pet that moved to another user of the potential friend list of the user is displayed on an instant messenger of the another user, and an owner information of the cyber pet is provided to the another user, so that the another user is able to read the owner information of the cyber pet.

16. The method for making friends by a cyber pet according to claim 14, wherein the movement route is displayed, including yet another user located between the another user where the cyber pet moved and the owner of the cyber pet.

17. A system for making friends by a cyber pet, which provides a user using an instant messenger with a service for raising a cyber pet and making friends through the cyber pet moving to a registered friend list, the system comprising:
an instant messenger server for providing an instant messenger program having a service function for raising a cyber pet and making friends through the cyber pet, maintaining connection information of users connected to an instant messenger to enable communication between the users, and collecting friend list information from the users and storing and managing the information;
a cyber pet providing unit for providing a cyber pet raising service by receiving from the instant messenger server a first group friend list registered by the user, a second group friend list registered by each friend in the first group friend list and an Nth group friend list (N is 2 or more) hierarchically linked thereto, forming a potential friend list from the second and subsequent group friend lists, and moving the cyber pet to the first group friend list and the potential friend list of the user;
a total database linked with the instant messenger server and the cyber pet providing unit for storing and updating information of the user and the cyber pet; and
a client terminal having the instant messenger program installed therein, and when the instant messenger is executed and an active window of the instant messenger is opened, displaying the cyber pet to provide the user with the cyber pet raising service, wherein, in the case that the cyber pet is not raised at the user's client terminal for a predetermined time, the cyber pet providing unit moves the cyber pet to the first group friend list and the potential friend list of the user with a predetermined probability, displays the cyber pet to another user executing the instant messenger to provide the another user with the cyber pet raising service, and enables raising information exchange of the cyber pet between the user and the another user and communication mediation through the cyber pet therebetween.

18. The system for making friends by a cyber pet according to claim 17, wherein the cyber pet providing unit includes:
a cyber pet raising module for displaying the cyber pet on the user's client terminal when the instant messenger is executed in the user's client terminal, to provide the user with a cyber pet raising service;
a cyber pet moving module for moving the cyber pet to the first group friend list and the potential friend list of the user in the case that the cyber pet is not raised at the user's client terminal for a predetermined time;
a cyber pet supporting module for supporting a raising item, voice, text and image of the cyber pet; and
a cyber pet item trading module for controlling purchase, exchange, trade, gift and lending of an item used to raise the cyber pet or of a special cyber pet.

19. The system for making friends by a cyber pet according to claim 17, wherein the instant messenger is executed automatically upon operation of the user's client terminal or as per the user's direct request of execution of the instant messenger.

20. The system for making friends by a cyber pet according to claim 19, wherein, in the base that the instant messenger is automatically executed, the cyber pet providing unit moves the cyber pet to the first group friend list and the potential friend list of the user with a predetermined probability.

21. The system for making friends by a cyber pet according to claim 18, wherein the potential friend list of the user includes a second group friend list registered in an instant messenger of each friend in the first group friend list registered in the instant messenger of the user, and an Nth (N is 2 or more) group friend list hierarchically linked thereto.

22. The system for making friends by a cyber pet according to claim 21, wherein the cyber pet moving module moves the cyber pet to another user designated by the user among friends registered in the first group friend list.

23. The system for making friends by a cyber pet according to claim 21, wherein the cyber pet moving module moves the cyber pet to the first group friend list and the potential friend list of the user at random with probability set by the user.

24. The system for making friends by a cyber pet according to claim 21, wherein the cyber pet moving module moves the cyber pet to the second group friend list with higher probability than to the first group friend list when moving the cyber pet to the first group friend list and the potential friend list of the user.

25. The system for making friends by a cyber pet according to claim 19, wherein, in the case that the cyber pet has a special item or the cyber pet is a special character, the cyber pet moving module allows to move the cyber pet to fourth and subsequent group friend lists of the potential friend list.

26. The system for making friends by a cyber pet according to claim 18, wherein, in the case that the cyber pet moved to another user is not raised by the another user for a predetermined time, the cyber pet moving module continues to move the cyber pet to yet another user.

27. The system for making friends by a cyber pet according to claim 26, wherein as time used for the cyber pet to move to or stay at another user increases, the cyber pet moving module decreases a status index (a physical index and a health index) of the cyber pet, and in the case that the status index falls to a predetermined level or less, the cyber pet moving module returns the cyber pet to the user.

28. The system for making friends by a cyber pet according to claim 27, wherein the cyber pet moving module detects use of a status index recovering item and recovers the status index of the cyber pet, and as a predetermined time passes after the cyber pet returns to the user due to decrease of the status index, the cyber pet moving module recovers the status index of the cyber pet.

29. The system for making friends by a cyber pet according to claim 18, wherein the cyber pet moving module moves the cyber pet of the user and a cyber pet of another user together to yet another user.

30. The system for making friends by a cyber pet according to claim 17, wherein the cyber pet providing unit limits the number of cyber pets displayed on the user's client terminal to a predetermined number.

31. The system for making friends by a cyber pet according to claim 17, wherein the cyber pet is at least one individual of the same or different kind, selected from the group consisting of a living thing existing offline, an imaginary thing not existing offline and a lifeless machinery, and is embodied as an image capable of voice, text and motion expression.

32. The system for making friends by a cyber pet according to claim 17, wherein the instant messenger executed in the user's client terminal displays movement route and state information of the cyber pet moved to the potential friend list of the user, and provides information of another user where the cyber pet moved.

33. The system for making friends by a cyber pet according to claim 32, wherein the instant messenger executed in another user's client terminal displays movement route and state information of the cyber pet moved to the potential friend list of the user, and provides an owner information of the cyber pet.

34. The system for making friends by a cyber pet according to claim 30, wherein the movement route includes yet another users located between another user where the cyber pet moved and an owner of the cyber pet.

35. The method for making friends by a cyber pet according to claim 17, wherein the movement route is displayed, including yet another users located between the another user where the cyber pet moved and the owner of the cyber pet.

36. The system for making friends by a cyber pet according to claim 31, wherein the movement route includes yet another users located between another user where the cyber pet moved and an owner of the cyber pet.

\* \* \* \* \*